United States Patent [19]

Tallon

[11] Patent Number: 5,058,313
[45] Date of Patent: Oct. 22, 1991

[54] METHOD AND APPARATUS FOR EXTERMINATING STRUCTURE INFESTATIONS

[76] Inventor: Joseph C. Tallon, 5702 Pioneer Dr., Bakersfield, Calif. 93306

[21] Appl. No.: 356,001

[22] Filed: May 22, 1989

Related U.S. Application Data

[63] Continuation-in-part of Ser. No. 1,871, Jan. 9, 1987, abandoned.

[51] Int. Cl.$^5$ .............................................. A01M 1/20
[52] U.S. Cl. ..................................... 43/124; 43/132.1
[58] Field of Search ...................... 43/124, 132.1, 144, 43/140

[56] References Cited

U.S. PATENT DOCUMENTS

| | | | |
|---|---|---|---|
| 1,948,228 | 2/1934 | Urban | 43/132.1 |
| 2,114,494 | 4/1938 | Hummel | 43/132.1 |
| 4,370,534 | 1/1983 | Brandon | 43/124 |
| 4,640,044 | 2/1987 | Varnon | 43/132.1 |
| 4,817,329 | 4/1989 | Forbes | 43/132.1 |
| 4,843,752 | 7/1989 | Munemasa | 43/144 |

FOREIGN PATENT DOCUMENTS 2828743 1/1980 Fed. Rep. of Germany ........ 43/144
418942 11/1934 United Kingdom .

OTHER PUBLICATIONS

Ron Hall, "Turn Up the Heat" Pest Control, Feb. 1989, pp. 86, 87.
Forbes & Ebeling, "Update: Use of Heat for Structural Pests", TThe IPM Practitioner, vol. IX, No. 8, Aug. 1987, pp. 1–5.

*Primary Examiner*—Kurt Rowan
*Attorney, Agent, or Firm*—Bernard L. Kleinke; William P. Waters; Jerry R. Potts

[57] ABSTRACT

A new method and apparatus includes the inspection of structural wooden members within a structure wall, and then the isolation of the wooden members infected with the insects. Heat producing devices are positioned adjacent to a first one of the isolated wooden members on the outside of the wall. The positioned heat producing device is then activated, and the adjacent isolated wooden member is caused to be heated to increase the temperature thereof sufficiently to kill a large number of the insects contained therewithin to eradicate substantially the entire infestation thereof. The heat producing device is then de-activated after the insect killing temperature has been attained. Thereafter, the remaining individual ones of the isolated infected wooden members are treated in a similar manner.

23 Claims, 4 Drawing Sheets

METHOD AND APPARATUS FOR EXTERMINATING STRUCTURE INFESTATIONS

CROSS REFERENCE TO RELATED APPLICATIONS

This application is a continuation-in-part patent application of co-pending patent application Ser. No. 001,871, filed Jan. 9, 1987, now abandoned.

1. Technical Field

This invention relates generally to devices and methods for exterminating insects. More particularly, it relates to devices and methods for exterminating colonies of drywood termites, within isolated wood members, without the use of toxic substances.

2. Background Art

It has long been recognized that enormous economic damage is caused by insects which consume growing plants, food stores and lumber. In the temperate regions of the world, the drywood termite is a major pest, causing great economic damage, because of its capacity for infesting and destroying structural wood members, such as studs, plates and beams.

Infestation occurs when, under appropriate climactic and environmental conditions, a number of king and queen termites leave an established colony in the search for new wood. King and queen termites must, in a matter of a few hours, mate and find the wood in which to begin a new colony. Upon finding a suitable location, the king alates and queen alates lose their wings, bore into the wood and establish a chamber therein. The queen lays eggs within the chamber and the process of infestation of the wood begins.

The drywood termite is a social insect and the majority of them spend their entire lives within colonies in wood. They consume the cellulose in wood, and as they increase in size and number, the cellulose substance of the wood is irreversibly and inexorably depleted and the wood is thus destroyed. Usually, the colony begins in a small chamber within a wood member, for example, and as it grows, the termites tunnel through its substance, thereby enlarging the colony and exposing more of the cellulose material to the insects. Often, colonies extend, within a typical wood member, for a distance of from one foot to almost the entire length of the member.

After discovery of some termite infestation, it is possible to replace or chemically treat the infested member, thereby ridding a structure of the termite problem. Frequently, however, individual structural members are enclosed within various walls of the structure, and are therefore, inaccessible. In the usual case, a number of various different wooden members, scattered throughout an entire structure, may become infested. In this regard, the infested members are generally distributed randomly throughout the structure.

The objective of any system of termite extermination is to kill a substantial number of the insects in a colony, or else the infestation will not die.

A well known technique for termite extermination is the application of highly toxic substances to the interior infested structure. This technique is the classical tenting and fumigating process. Here, a tent or covering is erected over the entire structure to be treated, the objective being to attain a substantially air tight confinement over the structure to retain the gaseous fumigants therewithin. Poisonous gas under pressure is then introduced under the tent to flow to the inside areas of the structure. These poisons kill any living organism with which they come into contact. It is a measure of the lethal capacity of the poisons that, in a relatively short period of time, enough poison diffuses through the cellular structure of all of the wooden members to exterminate every termite colony present within individual ones of the wooden members shattered randomly throughout the structure.

While the classical tenting and fumigation technique is effective, it presents many serious problems. In the first place, it is expensive, requiring a considerable amount of labor to fashion an air tight tent over a building or structure to be fumigated. Because of the lethal effects of the poisons utilized, the method requires evacuation of the occupants of the structure for a period of several days, thereby frequently necessitating expense for temporary lodging. Of course, it is essential that plants, and pets also be removed temporarily from the structure, lest they be killed inadvertently as well. Thus, it is inconvenient and undesirable to be required to transport them to a safe location, during the fumigation process. Furthermore, it has now been learned that chemicals being used are a threat to the environment, such as the ozone layer.

In addition to these drawbacks for the owner of the structure, there may be physical danger for the exterminator. Firstly, the poisonous substances must be carefully avoided by the highly trained exterminators, to avoid exposure thereto. Some fumigants have a cumulative effect on the body, and thus constitute a serious threat to the health of the exterminator.

Secondly, the exterminator ordinarily is required to climb onto the roof of the building to secure the tent in place. As a result, during the installation of the tent, exterminators have been injured by falling accidentally from the structures. In addition, traffic across the roof of a structure frequently results in damaged or broken roofing materials, such as roof tiles or the like, which can then leak during rains.

Another limitation of the fumigation process is the fact that the fumigant poisons leave residues, which are irritating to sensitive people, after they return to the fumigated structure, and which, in some cases, cause health problems. It is not unusual for many deaths per year to occur as a result of exposure of human beings to the poisonous fumigants currently employed.

As a result of the public health hazards presented by conventional extermination methods, municipalities have enacted strict environmental controls on the types of substances which may be utilized and the manner of their application. In view of the above, it is recognized that a delicate balance exists between the need for effective extermination of structural pests and the concomitant requirement to protect the environment and the public health.

Thus, it would be highly desirable if devices and methods existed for the treatment of insect infestations in structures, which devices and methods would have the effectiveness of the classical chemical methods, yet would be environmentally safe. It would be especially desirable if non-chemical, non-toxic devices and methods were available at a low cost, which could be utilized without leaving any harmful residue in their wake.

In an attempt to overcome these problems, as disclosed in Forbes and Ebeling, in The I.P.M. Practitioner, August 1987, forced air heating methods for the destruction of drywood termites have been proposed for the entire interior of the residential structures. In this regard, it was determined that the drywood termites could be killed by raising the ambient temperature of the interior of the structure to a sufficient high temperature to cause their destruction.

For this purpose, it was proposed to insulate the structure by covering it with suitable material, such as a black plastic wrap. A propane gas heater was proposed for delivering large volumes of heated air, through an 18 inch diameter duct, into the interior of the covered building having termite infested members. It was proposed to heat the entire interior of the building for a long period of time, such as more than one hour or probably for most applications, many hours, by the forced air heating technique, to cause the extermination of the termites within the infected wooden structural members, wherever located throughout the building.

While the method of Forbes and Ebeling proposes, albeit on an experimental basis, the possible approach of forced air heating a whole building for the extermination of drywood termites located in a relatively few number of infested wooden members, such a technique has serious practical limitations, and has virtually no application to the commercial setting. Firstly, such a method is similar to the fumigation concept, because it entails the covering over for insulation purposes the entire building. This is required as a result of the expensive and time consuming application of huge quantities of heat to the interior of the structure. The assembly of the covering is unwanted and undesirable for the same reasons as mentioned previously concerning the tenting of a building for fumigation purposes. In this regard, the assembly of the covering is expensive and time consuming, and presents a danger to the exterminator, as well as to the structure itself.

Secondly, even though an insulated covering may help retain the heat within the building and help reduce heat loss, the cost of applying the heat is excessive. Also, the elevated temperatures, within the building may cause damage to heat sensitive articles, such as computers, pianos, food products and others, disposed within the building. Of course, people, pets, and plants would have to leave the building as well, during such an operation for obvious safety purposes. Furthermore, it is clear that the covering of the entire building and the heating of the entire interior thereof to a sufficiently high temperature to destroy the termites in only a few wooden members is totally impractical and out of the question for large commercial or industrial buildings.

In short, it is clearly not practical to heat the entire interior of any structure, in order to destroy termites located in a relatively few number of infested wooden members of that structure.

Further, the use of heating devices, such as propane heaters, presents serious health and environmental concerns. The heater must be located in a well-ventilated area, generally outside of the structure undergoing treatment, so that the products of combustion can be vented readily into the atmosphere. The use of such heaters in non-ventilated spaces can cause serious health problems for anyone who breathes the exhaust fumes.

Further, the heaters pose a significant fire hazard due to the open flames associated with them. For this reason, propane heaters and the like can not be used conveniently in confined spaces such as attics and subfloor areas. These areas are often, of course, locations of termite infestation. This approach also presents a danger of combustion of the building itself, because the structural elements can be heated at or near the flash point due to the lack of precise control of the temperature increase. For these and the foregoing reasons, the use of propane heaters and others such combustion heaters to heat large volumes of air, does not represent an efficient, nor practical, method for exterminating drywood termites.

In addition to such serious limitations, the technique of heating the air within the entire interior of the structure in order to exterminate drywood termites in only a few number of wooden components thereof, has other inherent unwanted and undesirable limitations. In the February, 1989 issue of "Pest Control," pages 86-87, there is discussed the serious drawbacks concerning the technique of heating a whole building to kill termites. The article states that, in general, the house is tarped similar to tenting for fumigation and that, because hot air tends to rise to the ceiling, expensive and awkward to use fans are required presumably throughout the structure to direct hot air from the ceilings to the floor area to help distribute the heat uniformly. Furthermore, it is stated that the heating process may be even more prolonged where large wooden structural members are present. For example, the center of a four inch header could be heated to a temperature lethal for termites in one and one half hours, or even longer.

Additionally, and even more importantly, the article mentions that there are certain building elements or areas within the building which are extremely difficult to heat, according to the proposed whole building heating approaches. For example, a sill plate on a cold concrete slab is very difficult, if not impossible to heat to a lethal temperature by such proposed techniques. Thus, should the termites reside in such a sill plate, they may well survive the whole building heating process.

As a proposed attempt to lessen these problems, it was suggested in the Pest Control article, without disclosing how it would be accomplished, that less than the entire interior of the building be heated. For example, it was proposed to heat a wall, a room, or an attic. However, such a proposed solution completely falls short of solving the problem. In this regard, if an obvious infested sub-area of the building were infested and the entire sub-area heated to kill the termites therewithin, such a technique constitutes an overkill as well. The amount of heat required is excessive and wasteful. Also, the risk of imprecisely uncontrolled heating can create a danger of raising the temperature to the flash point, thereby resulting in the inadvertent setting of the building on fire.

Thus, such a proposed solution is not a complete and effective solution to structure infestation.

The basic problem is that only a small number of infected, randomly scattered, building elements need be treated in a practical and efficient manner. The covering of the entire building, and then treating the entire interior space is, as mentioned previously, impractical, even though effective in its application. Whereas, the forced-air heating of sub-spaces within the building is not totally practical, because of the excessive heating and possible damage to the structure and its contents by setting them on fire.

Furthermore, even after one portion of the interior is heated, apparently fans must be used to reduce the temperature within those sub-areas, before the occupants can return to the building. Thus, such a requirement is not at all acceptable, nor satisfactory, for many applications.

Other techniques for extermination of pests are disclosed in U.S. Pat. No. 4,640,044, and British patent 418,942. However, such techniques are not at all directed to the extermination of drywood termites in structures, in a convenient and effective manner.

In light of the above, it would be highly desirable, to have an environmentally safe, quick, non-toxic, and non-chemical method for the extermination, when properly applied, of all the termites within a structure or building, without the need for covering or tenting thereof. Such a technique should provide a complete eradication of the termite infestation to such a high degree of certitude that purchasers and lending institutions can rely on such a technique, in a similar manner as they have had in conventional fumigation and tenting procedures.

DISCLOSURE OF INVENTION

It is the principal object of this invention to provide a new and improved method and apparatus for effective extermination of insects within structural members.

It is a further object of the present invention to provide such a new and improved method and apparatus for exterminating substantially all drywood termites in a structure, without the need for poisonous chemicals or covering the entire structure.

It is a still further object of the present invention to provide such a new and improved method and apparatus for exterminating substantially all drywood termite infestations within a building or structure, in a practical and efficient manner.

Briefly, the above and further objects of the present invention are realized by providing a method and apparatus for eradicating substantially all of the insect infestations in a structure or building having a number of wooden structural members containing insect infestations scattered throughout the structure. The technique does not require fumigation or covering of the structure. Moreover, it completely eradicates all of the infestations throughout the structure to a sufficiently high degree of certitude, in a controlled and effective manner.

A new method and apparatus includes the inspection of the wooden members, and the isolation of the wooden members containing the insects. Individual temperature altering devices, such as heat producing devices are used, and are positioned adjacent to a first one of the isolated wooden members. The positioned device is then activated and the interior temperature of the adjacent isolated wooden member is caused to be altered to change the temperature thereof sufficiently to kill a sufficiently large number of the insects contained therewithin to eradicate substantially the entire infestation contained therewithin. The device is then deactivated after the critical temperature has been attained. Thereafter, the remaining individual ones of the isolated wooden members are treated in a similar manner.

Thus, by employing the method and apparatus of the present invention, the insect infestations scattered randomly throughout the entire building can be eradicated in an effective and practical manner. There is no need for the undesirable fumigants and structure covering, and yet the entire structure can be rid of the unwanted infestations. All of the individual infested structural wooden members, including foundation sill plates, are quickly and conveniently treated. In this regard, the inventive method and apparatus is not only safe to use, it is also highly effective. It is substantially as effective as the offensive conventional fumigation and tenting approach, because the novel technique insures that substantially all of the individual infected members are treated, even though many or all of them are concealed and not exposed to view.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
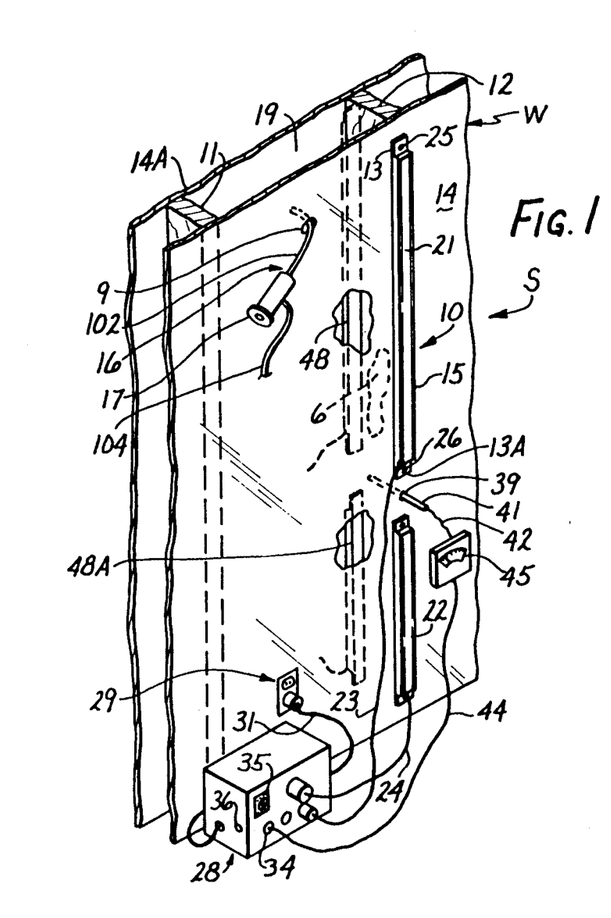
FIG. 1 is a pictorial view of an apparatus constructed in accordance with the present invention and illustrated treating an infested wooden member of a portion of a wall.

Referring now to the drawings, and more particularly to FIG. 1 thereof, there is shown a system or apparatus 10, which is constructed in accordance with the present invention, and which is used to treat a termite infected wooden member in the form of a stud 12 within a wall W.

The system generally comprises a group of heating strips, such as strips 21, 22 48 and 48A, which are used for elevating the temperature within a termite colony generally indicated at 6 which is located within a wooden stud 12 of a wall W of a building or structure indicated generally at S. In FIG. 1, the conventional wall W includes wooden studs 11 and 12 fixed between wallboards 14 and 14A. The wallboards 14 and 14A, together with the studs 11 and 12, help define the sides of a wall space or void 19.

It should be understood that there are typically a large number of such structural wooden members helping form the wall W, the remaining of which have been omitted from the drawings for illustration purposes. One or more of individual ones of the structural members may be insect infected, and may well be concealed within the wall W. Such infected members may be scattered randomly throughout the wall S, and only one of the infected members is illustrated.

The method and apparatus of this invention is used to first isolate individual infected members within the wall without the necessity of dismantling it, and then to treat in a safe manner each individual member having an infestation. By treating only individual infected members, the inventive technique solves the problem associated with the prior known techniques of overkill, in that there is no longer a need to treat areas of the structure which are not infested. Moreover, the inventive method and apparatus performs the treatment in a safe and controlled manner to reduce greatly the threat of destruction by fire of the wall W or the structure S, or even of the wallcovering (not shown), if any.

In use, the first step in the drywood termite extermination process of the present invention is the identification of an area within a structure containing infestation.

In an average 2,000 square foot house, there are hundred of horizontal and vertical wooden members, and thousands of joints in which one wooden member is fixed to another. Of this number, it is not unusual for only five, or fewer, wooden members to contain termite infestations.

When the infestation is located in inaccessible wooden members, such as the stud 12 disposed behind the wall W covered by the wallboard 14, the isolation of the infested member 12 is accomplished according to the inventive method. The initial step in the inventive method is to isolate the general area of infestation. In the present example, the exterminator must first determine which walls, if any, forming the structure S, contain infested wooden structural members or elements, such as the stud 12 of the wall W.

The exterminator first performs a visual examination of all exposed structural surfaces of the structure S in a search for evidence of infestation. In this regard, it is not uncommon for drywood termites, as they leave an infested member in the search for new wood to infest, to bore through wall covering surfaces, such as wallboard. In the process, they leave evidence on the floor (not shown) adjacent to wall such as the wall W, near the location of the individual ones or more of the infested wooden members.

As a general rule, such evidence of the presence of drywood termites, such as wings, body parts, or frass will be observed on or near the surface of the wall containing the infested wooden member. In the event visual examination discloses such evidence of a general area of termite infestation, the next step in the inventive method is to identify which wooden member, concealed behind the wall covering 14, is infested.

Isolation of the infested wooden member or members within the wall W, is accomplished in one of several different steps of the method. One technique depends on locating infested members by the sound made by termites within the member 12 after they have become agitated. In using this technique, the exterminator manually strikes the wall W in the vicinity of the suspected infested member. Movement on the part of the termites, caused by agitation and response to the striking, is detected The audible detection of infestation is performed by the utilization of trained dogs which are brought into the room next to the wall W, to detect sound, if any, emanating from the agitated colony. The dog then indicates the stud 12 by being attracted toward the agitated colony, thereby identifying the stud 12 containing the infestation, concealed behind the wallboard 14.

In another example of utilization of audio techniques, a conventional electronic stethoscope (not shown) is used. In this regard, the wall near the suspected infested member is struck manually one or more times, and the electronic stethoscope is then placed into engagement with the surface of the wall. Sounds emanating from the infested colony are then detected by the exterminator by using the stethoscope. An electronic stethoscope, suitable for detection of sounds emanating from a drywood termite colony, is available from B.A. Ford, 167 West Main Street, Fredonia, N.Y. 14063.

A preferred method of identifying which ones of the concealed wooden members are infested, entails visual examination of the wall space or void 19, adjacent to inaccessible wooden members, for evidence of termite infestation, without the necessity of dismantling the wall W. As shown in FIG. 1, the visual examination is performed by means of a fiberoptic device 16, which is inserted through an access opening 9 inserted in the wallboard 14, as hereinafter described in greater detail. The device 16 is preferably a fiber scope manufactured by Olympus Corporation, Industrial Fiber Optics Division, 4 Nevada Drive, Lake Success, N.Y. 11042.

The fiberoptic device 16 includes an objective lens (not shown) connected by a flexible glass fiber bundle 102 to an eye piece 17. Intermediate the objective lens and the eye piece is connected one end of a light cable 102 which guides light from a conventional source (not shown) of high intensity light, for transmission along the flexible glass fiber bundle 102 extending through hole 9, to the objective lens for illuminating the void 19. Light emanating from the objective lens within the void 19, illuminates the area to be examined by the fiber optic device, and the objective lens magnifies the viewing area so that the observer, by viewing through the eye piece 17, can visualize the area being examined. Flexibility in the flexible glass fiber bundle 102 permits movement of the objective lens within the wall space.

The device 16 is used to inspect for termite evidence within the wall W. In this regard, the evidence falls, under the effects of gravity, onto a horizontal wooden member such as a plate or a fire stop. Usually, the evidence of termite infestation is observed by using the device 16, in proximity to the infested member.

FIG. 1, the fiber optic device 16 is utilized to examine the wall space, or void 19, for evidence of the presence of drywood termites, such evidence including wings, body parts or frass. As an initial step in this phase of the method, the exterminator utilizes a conventional drill (not shown) to form a small hole having a diameter of approximately ⅛ inch to approximately ⅜ inch, such as the aperture or hole 9, in the wallboard 14, thereby providing access to the wall void 19. As depicted in FIG. 1, the aperture 9 is located high on the wallboard 14. However, in most cases, the exterminator begins his or her examination of the wall void 19 by drilling a small access hole (not shown) near the floor, since termite infestation evidence, under the force of gravity, frequently falls onto the horizontal base plate (not shown) in the vicinity of the infested wooden member.

As depicted in FIG. 1, the flexible glass fiber bundle 102, guides light from its proximal end inside the void to illuminate it. The light source (not shown), such as the one marketed under the tradename Olympus Xenon Light Supply IXLV, is activated, thereby transmitting light through the light cable 104 and into the glass fiber bundle 102.

The exterminator looks through an eyepiece, such as the eyepiece 17, thereby viewing the surfaces within the wall void 19 illuminated and visualized through the objective lens (not shown), of the fiberoptic device 16. The flexibility of the glass fiber bundle 102, enables the exterminator to move the objective lens within the wall void 19 so as to illuminate and visualize substantially all of the surfaces of the wooden members defining the wall void.

By utilizing the fiberoptic device 16, the exterminator can readily determine whether or not evidence of termite infestation exists within the wall void 19. In addition, the exterminator is able to isolate the infected wooden member, such as the stud 12, containing the termite infestation.

After the specific infested wooden member has thus been identified as such, the methods and treating devices disclosed herein, either individually or in combination, are utilized to effect eradication of the termite infestation in each identified infected member individually seriatim. The individual treatment is performed on each individual infected member in situ, without the need of damaging or disassembling the wall W. In this regard, the heating strips, such as the electric heating strip 21, applies heat directly to the outer surface of the wallboard 14 in registration with the infected stud 12 on the opposite side thereof, so that the stud 12 is heated through the wallboard 14 to the desired termite killing temperature.

In the utilization of the methods and individual heating devices specified herein, appropriate temperature controls are utilized so that the application of heat, to the inaccessible wooden members, can be controlled. Thus, a temperature lethal to the termites can be attained within the termite colony without damage to the structure, walls or wall coverings. In this regard, when the wallboard has been painted or otherwise coated, especially with an enamel paint, heating of the individual member is accomplished in a gradual manner so as not to cause damage, such as bubbling of the enamel paint, on the finished wall surface. On the other hand, when the wall surface is unfinished, such as in the case of unfinished wallboard, a rapid build up of heat can be accomplished without damage to the wallboard. For wallpaper, an intermediate heat buildup is employed In this regard, intermediate temperatures, higher than those utilized in the case of enamel finished surfaces, but lower than those utilized with unfinished wallboard, are utilized to exterminate termite colonies in inaccessible wooden members, with little or no damage to the wallpaper covering.

Drywood termites die at temperatures of approximately 125° F. In order to achieve extermination of a substantial number of drywood termites, the temperature of the wooden member in the vicinity of the colony, is raised to approximately 135° F. and maintained for a sufficient period, approximately 20–30 minutes, for the killing to occur.

Since wood is an insulator, to achieve heating in the center of a piece of lumber, the surface temperature of the member must be raised above the required temperature. Of course, the time required to achieve 135° F. at the center of a wooden member varies with the nature of the heat source and the distance of the heat source from the member. It is known that wood may be damaged if it is exposed to temperatures of 212° F., and above for extended periods of time. On the other hand, exposures for extended periods to temperatures of 170° F. do not cause degradation of wood.

In order to heat, conductively, the stud 12 to a sufficient temperature to exterminate the drywood termites of the colony 6, the precise location of the identified stud is first determined by conventional stud finding techniques. Once the exact location is determined on both sides of the wall W, the heating strips 21 and 22 are fixed vertically to the outer surface of the wallboard 14 in alignment with the concealed stud 12, utilizing conventional fastening devices, such as a pair of nails 25 and 26, extending through holes (not shown) in opposite ends of the strip 21. The heating strips 21 and 22 can vary in length from two to four, or more feet, thereby providing flexibility for the areas to be heated.

In some applications, similar electrically activated heating strips, such as the heating strips 48 and 48A, may be fixed to the outer surface of the wallboard 14A on the opposite side of the wall W, thereby reducing the required heating time. In this regard, the strips 21 and 48 are long strips, and are attached to opposite sides of the upper portion of the wall W in a parallel, oppositely disposed manner. Similarly, the short strips 22 and 48A are attached to the lower portion of the opposite sides of the wall W, below the respective long strips 21 and 48. The short strips 22 and 48A are also parallel and oppositely disposed in alignment with the stud 12.

The heating strips 21 and 22 are, respectively, connected by electrical power cords 23 and 24 to a control box 28 which, in turn, is connected electrically by means of control box power cord 31 to a conventional electrical outlet 29 in the wall W to a supply of alternating current, for energizing the heating strips.

It should be understood that a similar control box (not shown) is used at the other side of the wall W for controlling the energization of the heating strips 48 and 48A, and is similar to the control box 28.

A pair of plugs 32 and 32A on the ends of the respective cords 24 and 23 are adapted to be inserted into corresponding ones of a set of electrical outlets or receptacles generally indicated at 34, in the front face of the control box 28. A timer 35 having a timer setting button 36, controls the flow of electricity to the heating strips, and shuts the electricity off after a predetermined period of time as preset manually by use of the button 36. In this regard, all of the electrical receptacles are electrically connected to the timer 35, so that when the timer 35 times out, the flow of electricity is interrupted to the heating strips.

As depicted in FIG. 1, a thermocouple probe 41 is inserted through an aperture or hole 39 in the wallboard 14 and into a hole (not shown) previously drilled in the stud 12 to monitor its interior temperature to insure that the temperature increases sufficiently to kill the insect contained therewithin. A probe wire 42 supplies an electrical signal to a temperature display 45 to indicate the temperature at the interior of the stud 12. A thermal control cord 44 connects the thermocouple probe 41 to the control box 28, so as to shut off electrical power if a predetermined maximum temperature has been attained before the timer 35 times out. In this manner, the temperature increase in the stud 12 is controlled precisely, to avoid causing the internal temperature of the stud to reach the point of combustion. However, the timer normally causes the power being supplied to the strips, to be interrupted, before the internal temperature exceeds the critical temperature where the thermocouple causes the deactivation of the heating strips.

Considering now the heating strips in greater detail with reference to FIG. 1, the heating strips are similar to one another, and only the heating strip 21 will now be described. The strip 21 generally comprises an elongated body portion 15 having end flanges 13 and 13A at its ends. An aperture or hole (not shown) in each flange receive nails 25 and 26 to fasten the heating strip directly to the outer surface of the wall to be heated. The body portion 15 has a flat underside to fit flat against the surface of the wallboard 14 to apply heat directly to it, and thus to the stud 12. An electrical resistance heating element (not shown) is disposed within the body portion 15 and is connected electrically to the cord 23.

Figure 2:
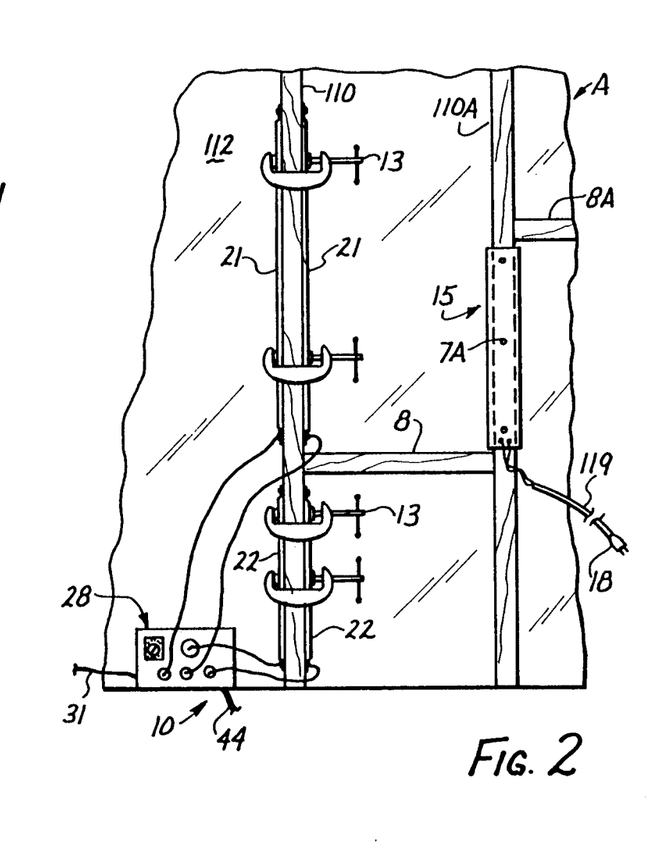
FIG. 2 is an elevational view of the apparatus of FIG. 1, together with an additional apparatus also constructed according to the present invention for treating wooden members in another wall, which has exposed wooden members.

Referring now to FIG. 2, there is depicted a wall A having exposed wooden members, such as studs 110 and 110A. The studs 110 and 110A are each fixed on one side to wallboard 112. A firebreak 8 is interposed between the stud 110 and the stud 110A and is, also, fixed on one of its sides to the wallboard 112. The heat treating system 10 is depicted in position adjacent previously located termite colonies (not shown) within the stud 110. A pair of heat strips 21 are fixed to opposite side faces of the stud 110. Holding means, such as a C-clamp 13 are utilized to fix the heat strips 21 in place. The heat strips 21 are electrically connected to a control box 28 which is the same as the control box 28 of FIG. 1. Heat strips 22, which are shorter than the heat strips 21, are fixed at appropriate locations on opposite side faces of the infested stud 110, on by means of the C-clamp 13. The shorter length of the heat strips 22 enable them to be placed on the stud 110 between the firebreak 8 and the bottom of stud 110. As in the case of the heat strips 21, the heat strips 22 are electrically connected to the control box 28. The thermocouple probe 41 is not necessary when exposed wooden members are being treated because the members can be visually monitored to insure safety.

In use, the control box 28 is connected to a conventional electric power source, and the heat strips 21 and 22 are electrically connected to the control box 28. As previously discussed, the timer 35 of the control box 28 is set for an appropriate period of time to allow heating of the infested stud 110 to occur. The utilization of heat strips fixed directly to opposite side faces of the infested stud 110 significantly shortens the time of treatment.

EXAMPLE I

To a 2×4 stud, approximately 72 inches long, a heat strip was attached and energized. The heat strip temperature was controlled by a high limit switch which deactivated the heat strip when its temperature, opposite the stud, reached 300° F. The initial wood surface temperature was 53° F. The interior temperature of the stud was measured and the following results were obtained:

| TIME (MINS.) | TEMPERATURE (°F.) |
|---|---|
| 10 | 106 |
| 20 | 146 |
| 25 | 148 |

To a 2×4 stud, approximately 72 inches long, a heat strip was attached and energized. The heat strip temperature was controlled by a high limit switch which deactivated the heat strip when its temperature, opposite the stud, reached 200° F. The initial wood surface temperature was 55° F. The interior temperature of the stud was measured and the following results were obtained:

| TIME (MINS.) | TEMPERATURE (°F.) |
|---|---|
| 10 | 82 |
| 20 | 106 |
| 30 | 121 |
| 40 | 130 |
| 50 | 135 |
| 60 | 138 |

EXAMPLE III

A drywood termite infested 2×4, approximately 92.5" in length, within a typical wall, having wallboard on both sides was heated utilizing heat strips. The heat strips had a 250° F. limit switch to deactivate the heat strip when its external surface, opposite the wallboard, reached 250° F. The wallboard on both sides of the infested stud was ½ thick and the heating strips were fixed vertically to the outer surfaces of both wallboards in alignment with the concealed termite infested stud. Interior temperatures of the stud were measured as follows: Location 1, 3 inches from the top, location 2 at the center and location 3, 3 inches from the bottom of the stud. The heat strips were activated and the results below were obtained. At the end of 50 minutes, the stud was removed from the wall, cut into sections and inspected for the presence of termites. No live termites were found.

| TIME | TEMPERATURE | | |
|---|---|---|---|
| | Loc. 1 | Loc. 2 | Loc. 3 |
| 0 | 60° F. | 60° F. | 60° F. |
| 10 min. | 60° F. | 60° F. | 60° F. |
| 15 min. | 74.2° F. | 76° F. | 73.8° F. |
| 20 min. | 102.6° F. | 104° F. | 103.2° F. |
| 40 min. | 125.4° F. | 128.2° F. | 126.2° F. |
| 50 min. | 139.4° F. | 142° F. | 143.2° F. |

EXAMPLE IV

An exposed drywood termite infested stud, approximately 92.5" in length was isolated. Heat strips were attached, substantially along the entire length of the stud on its opposite side faces. The heat strip temperatures were controlled by a high limit switch which deactivated the heat strips when the heat strip temperature, opposite the stud, reached 250° F. The interior temperature of the stud was measured at locations similar to the locations of Example III and the results below were obtained. During this test, the surface temperature of the stud reached a maximum of 317° F. At the end of 20 minutes, the heat strips were deactivated and removed, the stud was cut into sections and inspected for the presence of termites. No live termites were found.

| TIME | TEMPERATURE | | |
|---|---|---|---|
| | Loc. 1 | Loc. 2 | Loc. 3 |
| 0 | 60° F. | 60° F. | 60° F. |
| 5 min. | 73.4° F. | 76.2° F. | 73.6° F. |
| 10 min. | 105.2° F. | 107° F. | 106° F. |
| 15 min. | 128° F. | 130.2° F. | 128.2° F. |
| 20 min. | 140.4° F. | 144.6° F. | 141° F. |

Referring further to FIG. 2, there is depicted a flexible heating sheet 15 which can be wrapped around three faces of an infested wooden member, thereby applying heat simultaneously to more than one surface. The heating sheet 15 is located on the infested stud 110A adjacent a colony of termites (not shown). In use, the heating sheet 15 is connected by a conventional power cord 119, through an electrical plug 18 to a control box (not shown), which is similar in structure and function to the control box 28.

Figures 2A, 4:
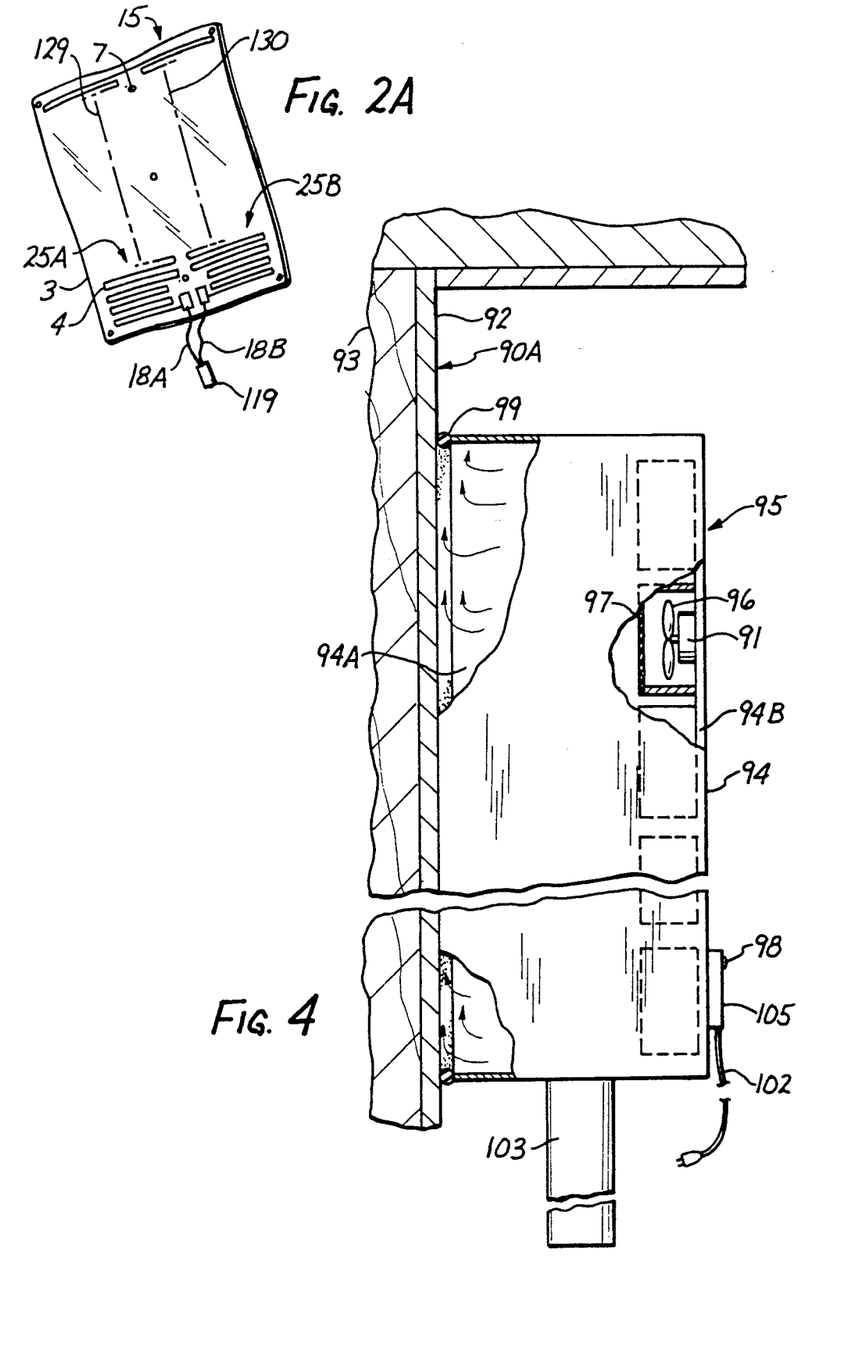
FIG. 2A is an enlarged scale pictorial view of the additional apparatus.
FIG. 4 is a fragmented, side elevation sectional view of a further apparatus constructed according to the present invention.

Referring now to FIG. 2A, the flexible heating sheet 15 generally comprises a body part 3 having an electrical resistance element 4 disposed within it. The resistance element 4 has a first portion 25A, and a second portion 25B both of which are configured in a Greek pattern. The first portion 25A is electrically connected to the second portion 25B and both portions are connected, respectively, through wires 18A and 18B to the electrical power cord 119. The body part 3 is a flexible film material of silicone rubber, mica, neoprene or similar elastomeric composition so as to be pliable and readily conformable to the shape of the wooden member to be treated. In addition, the heating sheet 15 may be of any suitable length and width so as to accommodate differing sizes of wooden members to be treated.

Referring now to FIG. 2A, a plurality of apertures, such as the aperture 7 are disposed across the surface of the material 3 to provide means for mounting the flexible film material 3 to the wooden member to be treated. A mounting means, such as a nail 7A of FIG. 2 is utilized to fix the film material 3 to the wooden member to be treated. Fold lines 129 and 130 run lengthwise in the material 3 to enable folding into a channel shape, thereby to overly the wooden member to be treated. Thus, the heat generated by the electrical resistance element is effectively transmitted to the three faces of the wooden member being treated, since the fourth face is covered by the wallboard 112, heat rapidly builds up within the number of undergoing treatment.

In use, the flexible heat strip 15, which may be of any suitable length, is attached to an isolated infected wooden member such as a stud 10A. The strip 15 contains one or more apertures such as the hole 7 to facilitate attachment of the strip 15 by means of suitable attachment means such as a nail 7A. Electrical leads 18A and 18B are combined in an electrical power cord 18 which, in use, is plugged into a conventional electrical outlet (not shown). During operation, the flexible heating strip 15 is fixed to an isolated wooden member and connected to an electrical power supply. The electrical resistance element imbedded within the strip 15 become hot, thereby heating the stud 10A. Electric power is supplied to the strip 15 for a time sufficient to raise the internal temperature of the 10 stud 10A to approximately 135° F.

The flexible heat strip 15, of FIGS. 2 and 2A can be procured from Watlow Electronic Manufacturing Co., 12001 Lockland Road, St. Louis, Mo. 63146.

Figure 3:
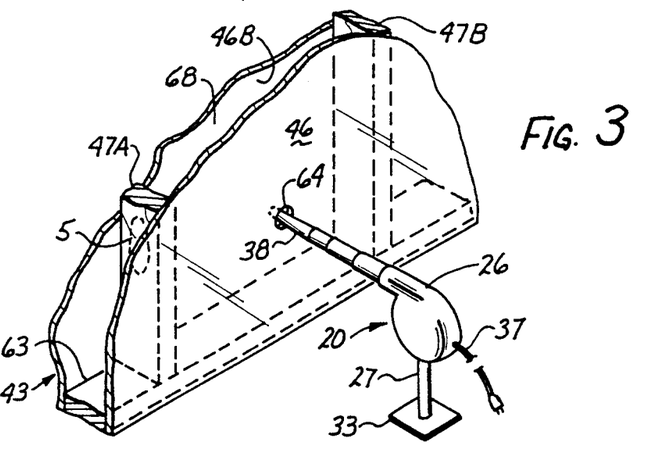
FIG. 3 is a pictorial view of a further apparatus according to the present invention and being illustrated treating an infected wooden member enclosed within a wall.

With reference now to FIG. 3, there are depicted the wall 43 which includes wooden members, such as a stud 47A and a stud 47B, which are inaccessible, and which are fixed, at their lower ends, to a plate 63 for supporting a pair of parallel wallboards 46 and 46B.

A temperature of 35° F. in the stud 47A is accomplished. The system 20 generally comprises a heater/blower assembly 26 which blows heated air through a delivery or outlet nozzle 38 through a previously drilled hole 64 in the wallboard 46, and into the void 68 for heating the stud 47A to a temperature sufficiently to kill the insects 5. The heater/blower assembly 26 is conventional, and a fan rests on a support or standard 27 which includes a base 33 for resting on the floor (not shown) adjacent to the wall 43. An electrical power cord 37 supplies electrical power to the heater/blower assembly 26, from a conventional electrical outlet (not shown).

In use, after an infested wooden member, such as the stud 47A has been isolated by employing the fiber optic device of FIG. 1, the hole 64 is then drilled in the wallboard 46 to provide access to the void 64, adjacent to the infested wooden stud 47A. However, the hole 64 may have been previously drilled to permit access to the fiber optic device.

The delivery nozzle 38 of the heater/blower assembly 26 is then inserted into the hole 64 for delivering hot air under pressure into the void 68. The heater/blower assembly 26 is then activated to heat the air in the void 68 by the introduction thereto of hot air, until the interior temperature of the stud 48 is increased to a sufficiently high temperature, such as 135° F., to, in turn, heat the infected stud to a temperature sufficient to kill the insects 5 therewithin. The heater blower assembly is then turned off after the interior temperature within the stud 47A has been maintained at 135° F. for a sufficiently long period of time such as approximately 30 minutes.

A thermometer (not shown) is inserted through another hole (not shown) in the upper portion of the wallboard 46, to monitor the air temperature of the void 46B.

Referring now to FIG. 4, there is depicted another system 95, which is constructed according to the present invention, and which is used for heating, correctively, isolated infected wooden inaccessible members such as a stud 93 helping support a wallboard 92 of a wall 90A. The stud 93 contains a colony of drywood termites (not shown).

The system 95 is in the form of a convective heating assembly, which receives electrical power through an electrical power cord 102 which can be connected electrically to a conventional electrical power source (not shown). A support or standard 103 is adjustable vertically by means (not shown), to permit the desired positioning of the assembly 95 at a selected height in alignment with the infected stud behind the wallboard 92.

The heating system 95 has a box-like housing 94, which is elongated in shape, and which is somewhat wider than the end edge of the stud 93. The housing 94 includes a rectangularly shaped opened mouth 94A, which has a resilient seal 99 extending along the rim thereof, for engaging sealingly flat against the outer surface of the wallboard 92. On the interior portion of the housing 94, there is provided a group of hot air blowers, such as a blower 91, mounted on a rear wall 94B of the housing 94, to direct hot air under pressure forwardly toward the opened mouth 94A to heat the wallboard 92, and in turn, the infected stud 93, in a similar manner as the system 10 of FIG. 1. The blower 91 drives a fan 96, which drives air across an electrically heated grid or screen 97, thereby heating the air and elevating the temperature within the assembly 95.

A timer 97 having a timer set button 98 controls the amount of time electrical power is supplied to the blowers, such as the blower 91, which are connected electrically in parallel through the timer 97 to the power cord 102.

In use, after a drywood termite colony has been located within the inaccessible wood stud 93, the convection heat system 95 is placed against the wallboard 92 opposite the stud. The electrical power cord 102 is then connected electrically to the power source, and the timer 97 is set by the timer reset button to a sufficient period of time to cause the stud 92 to an increased temperature for killing the colony of termites. The blowers are then activated to direct hot air against the wallboard 92. The air within the hollow housing 94 is heated to elevate the temperature of the wallboard and of the stud to a sufficiently high level to exterminate a substantial number of the drywood insects therein. When the timer times out, the electrical power is interrupted to de-activate the blowers.

Figure 5:
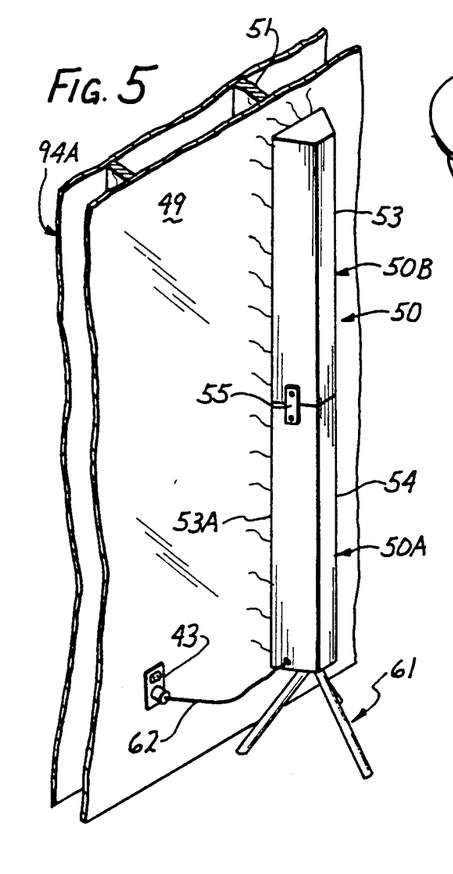
FIG. 5 is a pictorial view of still a further apparatus being constructed according to the present invention, and illustrating it in the process of treating an infected vertical wooden member within a wall.
Figure 6:
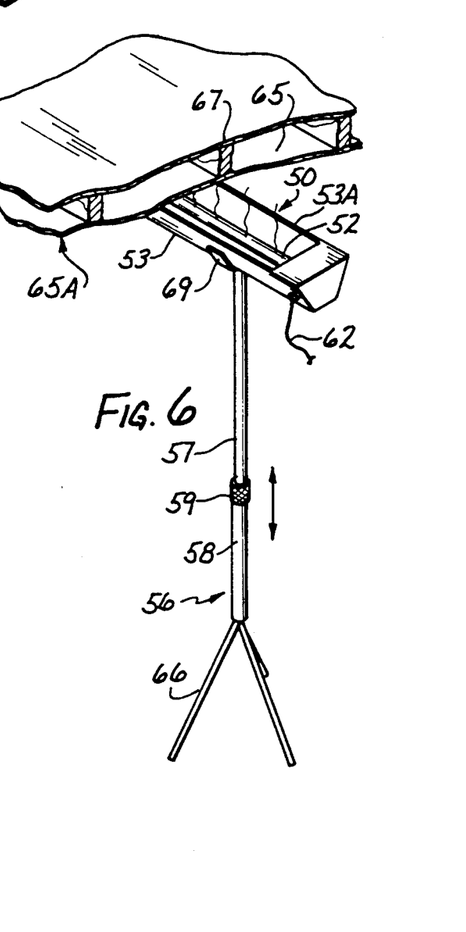
FIG. 6 is a pictorial view of the apparatus of FIG. 5 illustrating it in the process of treating a horizontal ceiling joist.

Referring now to FIGS. 5 and 6, there is shown a system 50, which is constructed according to the present invention, and which is adapted to heat radiantly isolated wood members, such as a stud 51, behind a wallboard 49 of a wall 49A. The radiant heating system 50 of FIG. 5 is supported on tripod legs 61, and is activated electrically via an electrical power cord 62, which is adapted to be connected electrically to a conventional source of electrical power via an outlet or receptacle 43.

The radiant heating system 50 generally comprises an infrared quartz lamp 52 (FIG. 6) which, when activated, delivers radiant heat from an elongated hood or cover 53 fixed thereto.

The system 50 includes a pair of like infrared heating assemblies 50A and 50B connected end to end, as shown in FIG. 5. In this regard, any number of the assemblies may be employed, to achieve a radiant heating assembly of a desired length. A pair of removable brackets, such as a bracket 55 affix the assemblies together removably.

In use, as shown in FIG. 5, the radiant heating system 50 is disposed vertically so that a rim 53A of the cover 53, is positioned at a distance of approximately four inches from the surface of the wallboard 49. The vertical position of the system 50 is adjusted relative to the infestation (not shown) in the stud 51.

The assembly 50 is then connected electrically to a conventional electrical outlet 43 to energize the lamp 52, thereby causing the wallboard 49 and the previously-determined infected wood member or stud 51 adjacent to the wallboard to be heated radiantly. In this regard, both assemblies 50A and 50B are connected together electrically, and both are energized simultaneously be connecting the power cord 62 to the outlet 43. The system 50 remains energized, until a timer (not shown) interrupts the power to the system 50. Thus, the operation of the system 50 is similar to the operation of the system 10. The radiant heating continues until the interior temperature of the wooden member reaches a temperature, such as about a temperature of 135° F., for a sufficiently long period of time, such as approximately 30 minutes.

While the systems depicted in FIGS. 1-4 are shown and described to be used for extermination of termite colonies in vertical wooden members, no such limitation is intended. In fact, the system of the present invention is equally useful for treatment of infestations in wooden members disposed in any plane including a plane other than a vertical one. For example, the system of the present invention may be employed equally as well, when the infestation to be treated is found to be located in horizontal wooden members.

In FIG. 5, the radiant heating system 50 is depicted as treating an infected horizontal ceiling joist 67 located in a ceiling 65A having a ceiling panel 65. The system 50 has its hood 53 resting on a telescoping stand or standard 56 which is adjustable vertically to position the hood 53 with its rim 53A spaced from the ceiling panel 65, to enable the system to heat the panel 65 and thus the infected joist above it, to a temperature sufficient to kill the infestation therewithin, according to the inventive method. A support bracket 69 at the top end of the standard 56 holds the assembly 50. The standard 56 includes an upper post or rod 57 which telescopes into a lower post or rod 58. A set of legs, such as a leg 66, supports the telescoping rods from below. In order to adjust the height of the telescoping stand 56, a knurled knob 59 fixes releasably the upper post 58 in relation to the lower post 58.

In use, the radiant heating system 50 is elevated to within approximately four inches of the ceiling panel 65, and electrical power is supplied to the system via the power cord 62, until the ceiling joist 67 has been heated to a sufficiently high temperature to kill the infestation, according to the inventive method.

EXAMPLE V

A drywood termite infested stud, in a standard wall having ½" wallboard on both sides of the stud was isolated. The stud was approximately 92.5" in length. Two infrared heating tubes, each approximately four feet in length, were joined together to form a heating unit approximately eight feet in length. The unit was placed approximately 6" to 8" from each of the wallboard surfaces adjacent to the infested stud. The interior wood temperature was measured at locations similar to the locations of Example III and the following results were obtained.

| TIME | TEMPERATURE | | |
|---|---|---|---|
| | Loc. 1 | Loc. 2 | Loc. 3 |
| 0 | 61° F. | 61° F. | 61° F. |
| 5 min. | 61° F. | 61° F. | 61° F. |
| 10 min. | 64.3° F. | 64° F. | 63.9° F. |
| 20 min. | 78.9° F. | 79° F. | 78.6° F. |
| 30 min. | 108° F. | 108° F. | 107.6° F. |
| 40 min. | 121.6° F. | 122° F. | 121° F. |
| 50 min. | 143.2° F. | 144° F. | 144.4° F. |

Figures 7, 8:
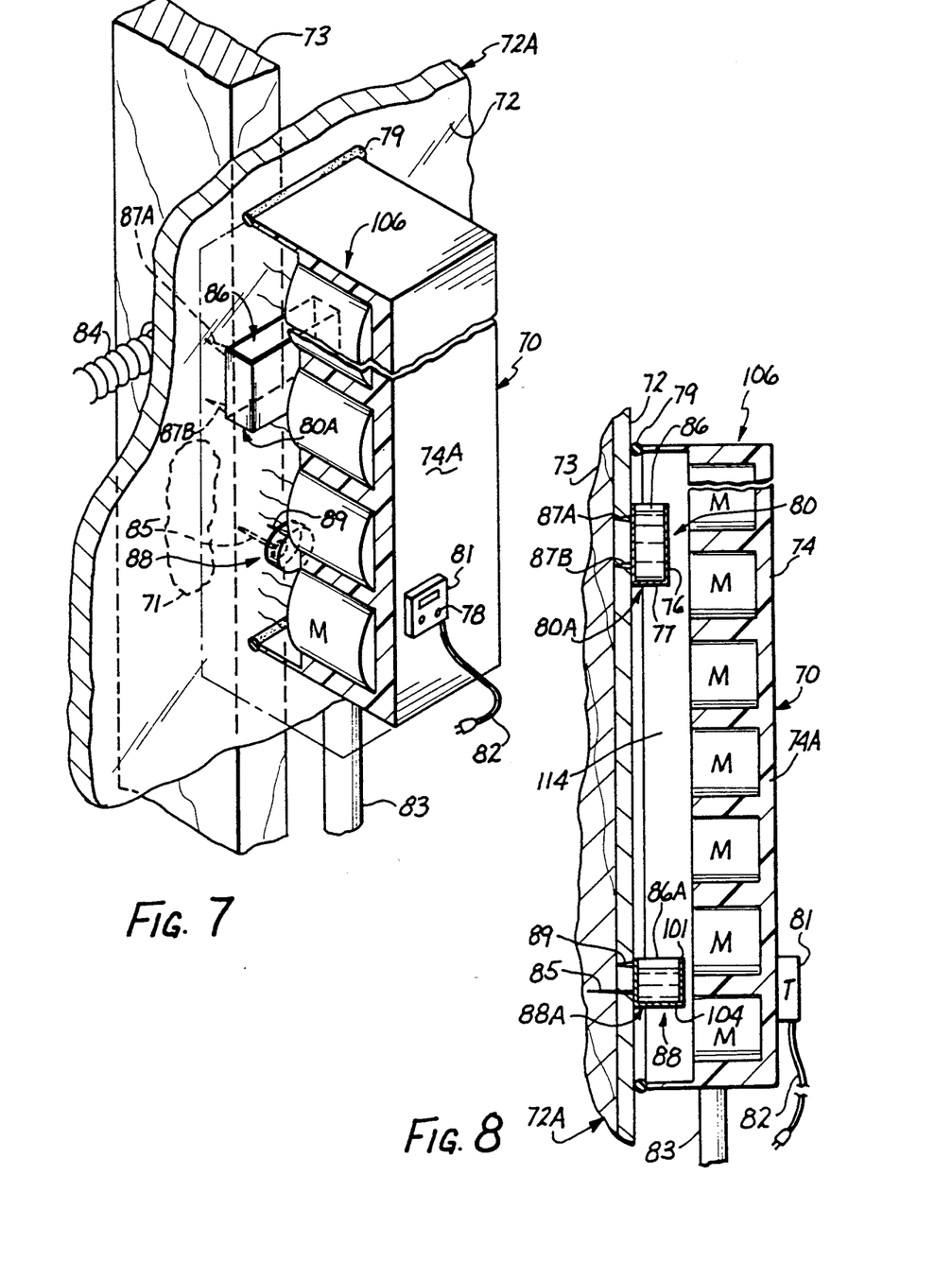
FIG. 7 is a fragmentary pictorial view of still a further apparatus constructed according to the present invention, being illustrated in the process of treating a wooden member of a wall.
FIG. 8 is a sectional side elevational view of the apparatus of FIG. 7.

As shown in FIGS. 7 and 8, there is shown a system 70, which is constructed according to the present invention, and which utilizes microwave energy to exterminate drywood termites in wooden members, such as a termite colony 71 (FIG. 7) located within a stud 73 behind a wallboard 72 of a wall 72A. The system 70 of the present invention utilizes the direct application of microwave energy to penetrate the wooden member to heat the bodily fluids of the termites to a temperature sufficient to kill them. This causes death of a sufficient number of insects so as to cause extermination of the colony.

The system 70 is powered through its electrical power cord 82 which is connectable to a conventional electrical power source (not shown). The microwave system 70 includes a support or standard 83 which is used attached to an adjustable support assembly similar to the support assembly 56 of FIG. 6.

A timer reset button 78, when pressed manually, causes a timer 81 to be set. The timer 81 serves a similar purpose as the timer of the system 10 of FIG. 1.

The system 70 generally comprises a housing 74, which may be composed of a suitable plastic material, and which has a generally rectangular opened mouth 104 (FIG. 8) sounded by a resilient seal 79 adapted to be pressed against the surface of the wallboard 72 opposite the infected stud 73. The annular seal 79 helps prevent the escape of microwave energy around a housing 74. Mounted within the housing 74 is a series of magnetrons generally indicated at 106 which, when electrically activated, discharge microwave energy forwardly out of the opened mouth 104. A rear wall 74A of the housing 74 supports the magnetrons 106, shown diagrammatically, one above the other in a column. As depicted in FIGS. 7 and 8, a multiplicity of magnetrons may be utilized, in order to provide sufficient microwave energy over a large area.

To help prevent the microwave energy from contacting metal objects, embedded in, or forming a part of the wall 72A, microwave shields such as a conduit shield 80 and a nail shield 88 are fastened removably to the outer surface of the wallboard 72 between the opened mouth 104 and a metal electrical conduit 84 and a nail 85, respectively.

The conduit shield 80 includes a hollow container 80A having four side walls, such as the side wall 76, connected to a bottom wall 77. An opened to permits a liquid, such as water 86, to be introduced to the hollow interior of the container 80A. A set of shield pins such as pins 87A and 87B extend rearwardly from the container 80A for being driven removably into the wallboard 72.

In operation, a metallic object such as the conduit 84 is located by means of a conventional metal detecting device (not shown), or by the optical device of FIG. 1. The pins of the conduit shield 80 are driven into the outer surface of the wallboard 72, in a location to interpose it between the magnetrons and the conduit 84, to shield it from microwave energy, by enabling the liquid 86 to receive and absorb the microwave energy in a safe manner, without causing the energy from contacting the metal conduit.

In use, before activating the magnetrons, the container 80A is filled, to a suitable level, with the water 86. Thereafter, the timer 81 is preset for a sufficient time to permit sufficient microwave energy to be released to kill the termites 71.

The magnetrons are then energized to direct microwave energy directly into the infected stud 73 for heating the termites 71, to a temperature sufficient to kill them.

When the metallic object is a screw, nail or the like as, for example, the nail 85, the nail shield 88 is employed for a similar reason as the conduit shield 80. The nail shield 88, is similar in construction to the conduit shield 80. It has a container 88A, having four side walls, such as the side wall 101, connected to a bottom wall 104, thereby forming a vessel having an opened top.

As in the case of the conduit 84, a nail in the stud 72 is discovered by conventional metal detecting methods. In order to fix removably the nail shield 88 to the wallboard 72, a pin 89 projects from a side wall 101 to be driven into the wallboard cover over the rail 85. As in the case of the conduit shield 80, prior to the application of microwave energy, a suitable volume of water 86A is placed within the nail shield 88 to absorb the microwave energy.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for exterminating insects in a plurality of wooden members of a structure, comprising the steps of:
    (a) inspecting the wooden members of the structure;
    (b) isolating individual ones of the wooden members containing the insects;
    (c) using heat producing means;
    (d) positioning said heat producing means adjacent to an individual one of the isolated wooden members;
    (e) activating the positioned means;
    (f) causing alterations to be produced by said activated heat producing means, within the adjacent isolated member to increase the temperature sufficiently to kill a sufficiently large number of the insects contained therewithin to eradicate substantially the entire infestation contained therewithin;
    (g) de-activating said heat producing means after said temperature has been attained; and
    (h) repeating steps (c) through (g) for the remaining individual ones of the isolated wooden members.

2. A method of claim 1, wherein said inspecting and said isolating includes visually examining said isolated member.

3. A method of claim 2, wherein said visually examining includes using an optic device to assist in viewing the wooden members 4. A method of claim 3, wherein the structure includes a wallboard member attached to said wooden members, and said inspecting includes forming a small hole in the wallboard and then inserting the optic device therethrough to illuminate and to assist in visualizing the wooden members for insect evidence.

5. A method of claim 1, wherein said locating includes examining said isolated member acoustically.

6. A method of claim 1, wherein said heat producing includes conductively heating.

7. A method of claim 1, wherein said heat producing includes radiation heating.

8. A method of claim 1, wherein said heat producing includes convective heating.

9. A method of claim 1, further including fixing said heat producing means to said isolated member.

10. A method of claim 1, wherein the fixing of said heat producing means includes positioning said heat means opposite to said isolated wooden member.

11. A method of claim 1, further including monitoring the temperature within said isolated member.

12. A method of claim 1, further including controlling said heat producing means so as to inhibit the increase of temperature within said isolated member above a predetermined temperature.

13. A method of claim 7, wherein said radiation heating includes microwave heating.

14. A method of claim 13, further including using a housing having an opened mouth, and having microwave producing means for generating microwaves and directing them out of said mouth to produce said heat.

15. A method of claim 14, further including positioning said housing with its mouth disposed, against the surface of the structure adjacent to the individual one of the isolated wooden members.

16. A method of claim 15, wherein said housing has sealing means extending along its mouth, and said positioning includes pressing said sealing means against said surface of the structure.

17. A method of claim 1, wherein said heat producing means includes means for conveying a heated fluid, and wherein said positioning includes forming a hole in the structure, and inserting said means for conveying a heated fluid therethrough to direct it into engagement with the individual one of the isolated wooden members.

18. A method of claim 1, wherein said positioning includes disposing said heat producing means in a spaced apart manner relative to the structure.

19. A method of claim 1, wherein said positioning includes attaching said heat producing means to the structure.

20. A method of claim 19, wherein said heat producing means includes an elongated heating strip having an electrically energizable heating element, wherein said positioning said heat producing means including attaching the strip to the structure in alignment with the individual one of the isolated wooden members, and wherein said activating includes supplying electrical energy to the heating element.

21. A method of claim 19, wherein said heat producing means includes an electrically energizable heating element, and wherein said activating the positioned means includes supplying electrical energy to said heating element.

22. A system for exterminating insects in a structural wooden member of a structure, comprising:

a heating strip for heating the infested member to an insect exterminating temperature;

said strip including an elongated body portion suitably dimensioned and shaped relative to the size and shape of the member;

said body portion including attaching means including a pair of apertured end flanges for enabling attachment of said body portion to the structure;

said body portion having a substantially flat underside to fit substantially flat against the surface of the structure to enable heat to be applied directly to the structure;

electrically energizable heating means for producing heat to supply it to the structure; and means for conveying electrical energy to said heating means.

23. A system for exterminating insects, in an insect infested structural wooden member of a structure, comprising:

a heating strip for heating the infested member to an insect exterminating temperature;

said strip including an elongated body portion suitably dimensioned and shaped relative to the size and shape of the member;

said body portion having a substantially flat underside to fit substantially flat against the surface of the structure to enable heat to be applied directly to the structure;

electrically energizable heating means for producing heat to supply it to the structure;

means for conveying electrical energy to said heating means; and temperature sensing means for sensing the interior temperature of said wooden member.

* * * * *

UNITED STATES PATENT AND TRADEMARK OFFICE
CERTIFICATE OF CORRECTION

PATENT NO. : 5,058,313

DATED : October 22, 1991

INVENTOR(S) : Joseph C. Tallon

It is certified that error appears in the above-identified patent and that said Letters Patent is hereby corrected as shown below:

Column 11, after Line 63, insert --EXAMPLE II--.

Column 13, Line 54, before "stud", delete "10".

Column 14, Line 23, before "assembly", delete "heater blower" and substitute therefor --heater/blower--.

Column 14, Line 35, after "heating", delete "correctively" and substitute therefor --convectively--.

Column 17, Line 26, after "opened", delete "to" and substitute therefor --top--.

Column 17, Line 62, before "85", delete "rail" and substitute therefor --nail--.

Signed and Sealed this

Twenty-first Day of September, 1993

Attest:

BRUCE LEHMAN

*Attesting Officer*  *Commissioner of Patents and Trademarks*